(12) United States Patent
Platipodis

(10) Patent No.: US 11,199,008 B2
(45) Date of Patent: Dec. 14, 2021

(54) DEVICES AND METHODS FOR COVERING AND SEALING GAPS BETWEEN ADJACENT SURFACES

(71) Applicant: Christopher Jay Platipodis, Valparaiso, IN (US)

(72) Inventor: Christopher Jay Platipodis, Valparaiso, IN (US)

( * ) Notice: Subject to any disclaimer, the term of this patent is extended or adjusted under 35 U.S.C. 154(b) by 0 days.

(21) Appl. No.: 16/832,366

(22) Filed: Mar. 27, 2020

(65) Prior Publication Data
US 2020/0308843 A1 Oct. 1, 2020

Related U.S. Application Data

(60) Provisional application No. 62/891,121, filed on Aug. 23, 2019, provisional application No. 62/824,606, filed on Mar. 27, 2019.

(51) Int. Cl.
| | |
|---|---|
| *E04F 13/04* | (2006.01) |
| *C09J 7/40* | (2018.01) |
| *C09J 7/21* | (2018.01) |
| *C09J 7/22* | (2018.01) |
| *C09J 7/28* | (2018.01) |
| *C09J 7/38* | (2018.01) |

(52) U.S. Cl.
CPC .............. *E04F 13/042* (2013.01); *C09J 7/21* (2018.01); *C09J 7/22* (2018.01); *C09J 7/38* (2018.01); *C09J 7/40* (2018.01); *C09J 7/28* (2018.01); *C09J 2301/12* (2020.08); *C09J 2301/122* (2020.08); *C09J 2301/16* (2020.08); *Y10T 428/14* (2015.01)

(58) Field of Classification Search
CPC .... E04F 13/042; C09J 7/22; C09J 7/40; C09J 7/21; C09J 7/38; C09J 7/28; C09J 2301/122; C09J 2301/12; C09J 2301/16; Y10T 428/14
See application file for complete search history.

(56) References Cited

U.S. PATENT DOCUMENTS

| | | | | |
|---|---|---|---|---|
| 4,582,737 | A | * 4/1986 | Torgerson | B05B 12/24 428/57 |
| 5,354,614 | A | * 10/1994 | Cox | C09J 7/20 428/343 |
| 5,374,477 | A | * 12/1994 | Lawless | E04B 1/6809 428/317.3 |

(Continued)

*Primary Examiner* — Patricia L. Nordmeyer
(74) *Attorney, Agent, or Firm* — Hartman Global IP Law; Gary M. Hartman; Domenica N. S. Hartman

(57) ABSTRACT

Devices and methods covering a gap between an edge of a surface and a body exposed through an opening in the surface defined by the edge. Such a device has at least first and second sections formed of different materials. The device is positioned so that the second section is over a portion of the surface adjacent the opening and the first section extends over the gap and the opening. After removing a release liner releasably secured to a backside of the first section to cover an adhesive, portions of the first section are bent and molded to plastically conform the portions to the edge of the surface while the second section remains over the portion of the surface adjacent the opening. The body is then contacted with the backside of the first section such that the backside of the first section is adhered to the body with the adhesive.

6 Claims, 7 Drawing Sheets

(56) References Cited

U.S. PATENT DOCUMENTS

| | | | |
|---|---|---|---|
| 7,282,250 B2* | 10/2007 | Musahl | H01B 7/186 |
| | | | 428/43 |
| 8,877,311 B1* | 11/2014 | Avila | B05B 12/20 |
| | | | 428/40.1 |
| 10,337,195 B1* | 7/2019 | Langkilde | E04G 21/243 |
| 2004/0048537 A1* | 3/2004 | Holzer | B29C 65/3656 |
| | | | 442/149 |
| 2010/0215900 A1* | 8/2010 | Conboy | C09J 7/35 |
| | | | 428/137 |
| 2012/0231230 A1* | 9/2012 | Siebert | C09J 7/21 |
| | | | 428/189 |

* cited by examiner

DEVICES AND METHODS FOR COVERING AND SEALING GAPS BETWEEN ADJACENT SURFACES

CROSS REFERENCE TO RELATED APPLICATIONS

This application claims the benefit of U.S. patent application Ser. No. 62/824,606 filed Mar. 27, 2019, and U.S. patent application Ser. No. 62/891,121 filed Aug. 23, 2019. The contents of these prior patent applications are incorporated herein by reference.

BACKGROUND OF THE INVENTION

The present invention generally relates to construction materials. The invention particularly relates to multilayered adhesive tapes and sheets capable of sealing gaps along edges of interior wall panels, for example, drywall panels or other construction materials.

When installing interior wall panels, such as drywall panels, of a building, such as a residential or commercial building, it is often necessary to cut out sections of the panels to provide openings for access to other mechanical fixtures, such as inlet and outlets of HVAC air ducts, exposed plumbing, electrical outlet boxes, recessed lighting fixtures, etc. (which are individually and/or collectively referred to herein as "fixtures" as a matter of convenience). Generally, installers attempt to minimize the dimensions of the cutout sections in order to reduce the size of gaps between the edges of the panel formed by the opening and the fixture exposed through the opening. The gaps are then preferably hidden by a fixture cover, such as a duct vent, electrical outlet cover, etc. However, if the gaps are too large, they may not be entirely covered with the fixture covers or may not provide sufficient structural support for the fixture covers. The gaps can also be a source of thermal losses due to outside air infiltration as a result of colder or warmer air located behind the panel leaking into a room.

Repairing gaps that are too large can be a difficult task which often results in poor aesthetics, for example, if one attempts to partially fill the gap with loose drywall patching compound (e.g., putty, spackle, joint compound, etc.). As such, it can be appreciated that it would be desirable if methods and materials were available for covering and/or sealing gaps between interior wall panels and fixtures exposed through openings in the panels.

BRIEF DESCRIPTION OF THE INVENTION

The present invention provides devices and methods suitable for covering a gap between an edge of a surface and a body exposed through an opening in the surface defined by the edge, such as but not limited to a gap between a fixture installed within an opening in an interior wall panel and an edge of the panel surrounding the opening.

According to one aspect of the invention, a device is provided that is in the form of a tape that includes an elongated length in a longitudinal direction parallel to a longitudinal axis of the tape and a width in a lateral direction perpendicular to the longitudinal axis. The tape includes at least first and second sections extending along the length of the tape. The first section is formed of a first material configured to be bent and molded to plastically conform to an edge of a surface, and the second section is formed of a second material that is different from the first material. The first material is configured to be bent or molded to plastically conform to an edge of a body. An adhesive is located on a backside of the first section to secure the device to the edge of the surface.

According to another aspect of the invention, a device is provided that is in the form of a sheet that includes a frame surrounding and defining an aperture therethrough and one or more flaps extending from edges of the frame surrounding the aperture. The flaps are a first section of the sheet and are formed of a first material configured to be bent and molded to plastically conform to an edge of a surface. The frame is a second section of the sheet and is formed of a second material that is different from the first material. An adhesive is located on a backside of the first section to secure the sheet to the edge of the surface.

According to another aspect of the invention, a method is provided for covering a gap between a body installed within an opening in a surface and an edge of the surface surrounding the opening. The method includes providing a device comprising at least first and second sections. The first section is formed of a first material having an adhesive on a backside thereof, and the second section is formed of a second material that is different from the first material. The device is positioned so that the second section thereof is over a portion of the surface adjacent the opening and the first section extends over the gap and the opening. After removing a release liner that is releasably secured to the backside of the first section and covers the adhesive, portions of the first section are bent and molded to plastically conform the portions to the edge of the surface while the second section remains over the portion of the surface adjacent the opening. The body is then contacted with the backside of the first section such that the backside of the first section is adhered to the body with the adhesive.

Technical effects of the devices and methods described above preferably include the ability to aesthetically cover and/or seal a gap between a body installed within an opening in a surface and an edge of the surface surrounding the opening. A nonlimiting example is the ability to cover gaps between edges of an interior wall panel and a fixture exposed through an opening in the panel, with the additional benefit of reducing thermal losses due to air infiltration through the gaps.

Other aspects and advantages of this invention will be appreciated from the following detailed description.

DETAILED DESCRIPTION OF THE INVENTION

Figure 9:
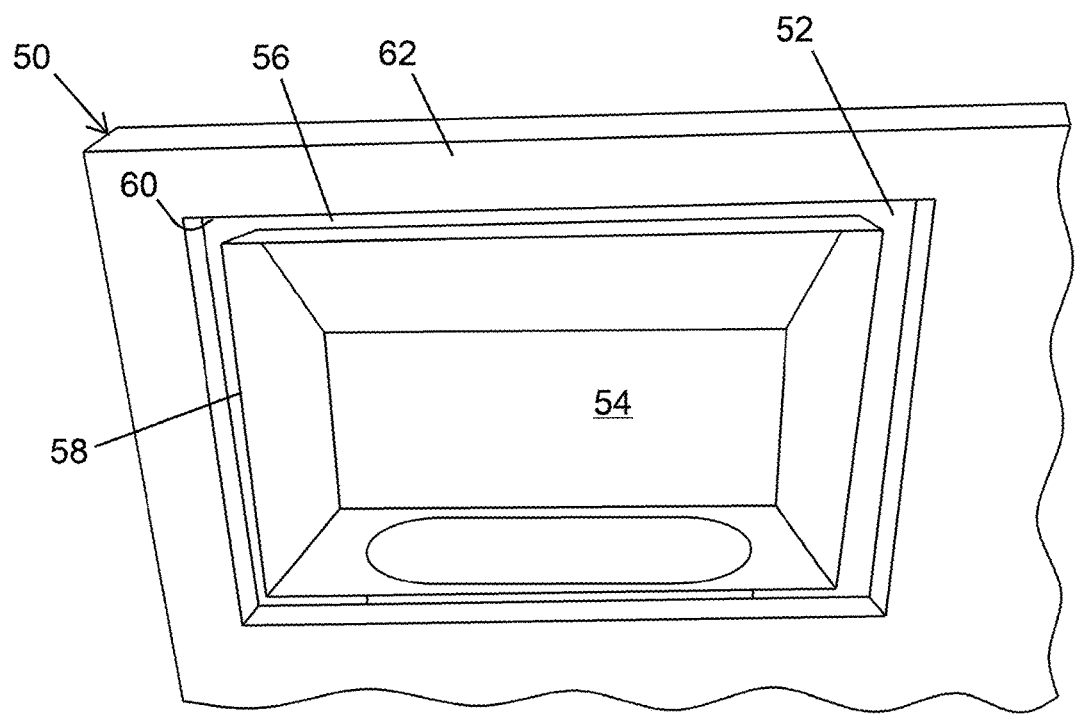
FIGS. 9 through 14 schematically represent nonlimiting examples of the multilayered adhesive sheet of FIGS. 5 and 6 applied to a drywall panel to cover and/or seal gaps between edges formed by openings in the surface of the panel and air ducts installed in the openings.

FIGS. 1 through 3 and FIGS. 5 and 6 schematically represent nonlimiting embodiments of, respectively, a multilayered adhesive tape 10 and a prefabricated multilayered adhesive sheet 30 configured for use in covering and/or sealing gaps between edges formed by an opening in a surface and a body exposed through the opening. Notable but nonlimiting examples include gaps between fixtures installed in holes in interior wall panels, such as drywall panels and other construction materials, of residential and commercial buildings. For example, FIG. 9 schematically represents a drywall panel 50 having a portion thereof cut out to create a hole or opening 52 in which a fixture (an inlet or outlet of a HVAC air duct) 54 is exposed. The opening 52 defines a gap 56 between the outer perimeter 58 of the duct 54 and the edges 60 of the opening 52 and the adjacent surface 62 of the drywall panel 50 that surrounds the duct 54. Such gaps are common in the construction industry when installing drywall paneling over inlets and outlets of HVAC air ducts, plumbing fixtures, electrical outlet boxes, recessed lighting fixtures, etc. (fixtures), and benefit from being covered or filled to reduce air infiltration and/or provide a finished appearance. Although the invention will be described hereinafter in reference to drywall panels and certain types of fixtures shown in the drawings, it will be appreciated that the teachings of the invention are more generally applicable to a variety of applications that benefit from sealing gaps between a wall, floor, or ceiling covering (or other panel-like object) and a second object present within an opening in the covering.

Figure 1:
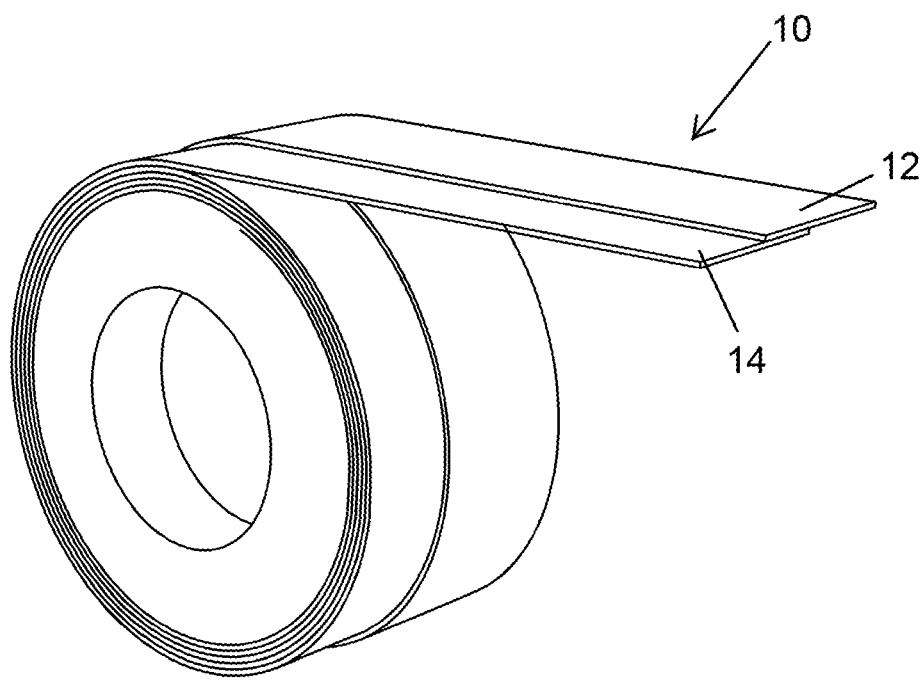
FIGS. 1 through 3 schematically represent a nonlimiting embodiment of a multilayered adhesive tape in accordance with certain aspects of the present invention.
Figure 2:
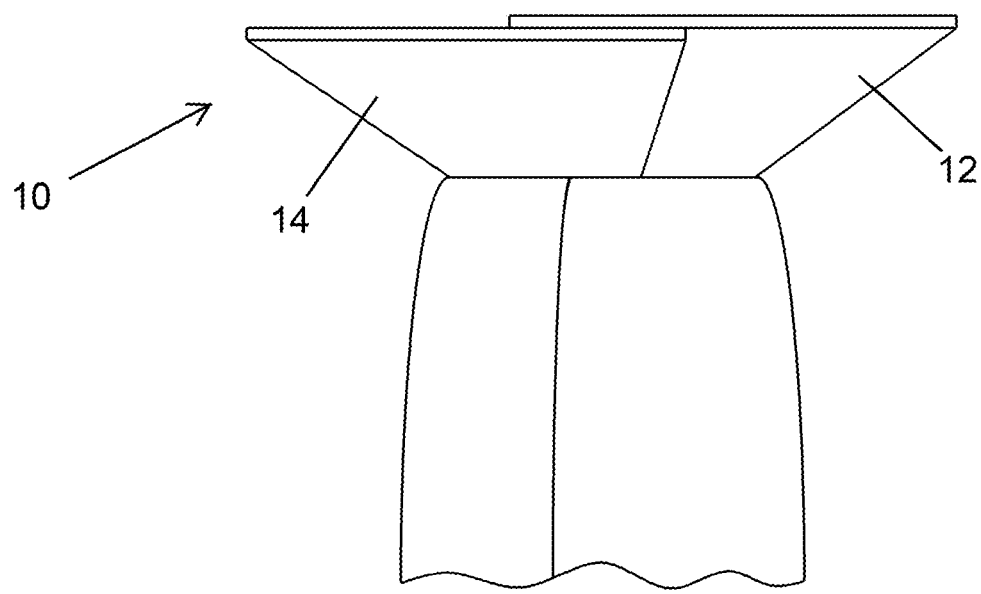
Figure 3:
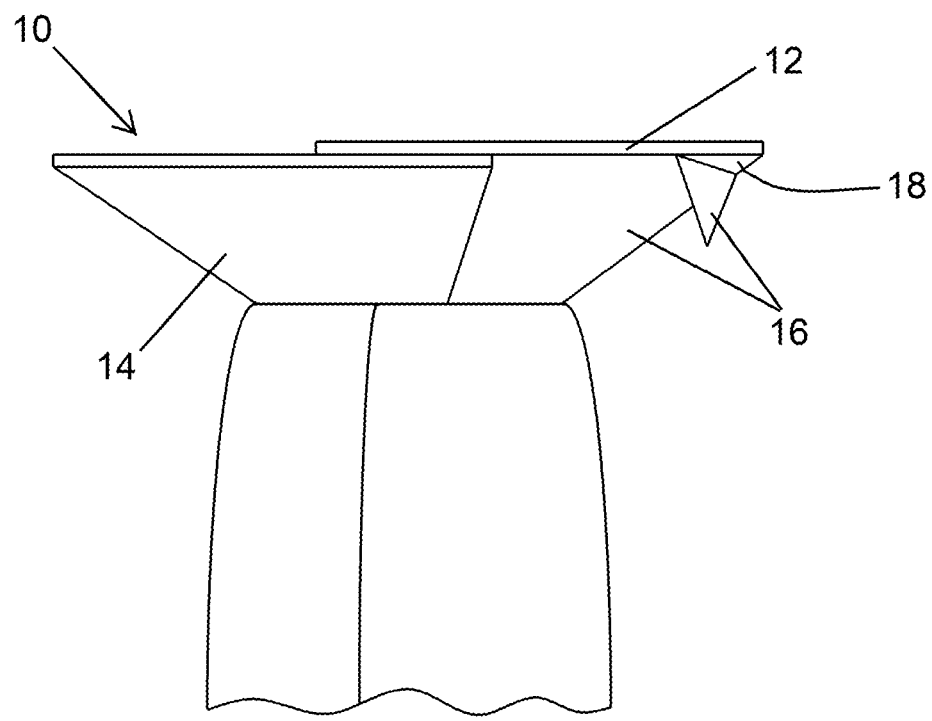

The multilayered adhesive tape 10 is depicted in FIGS. 1 through 3 as having been manufactured as a roll for ease of shipping, merchandising, and handling. The tape 10 includes multiple layers that comprise first and second tape sections 12 and 14 and a release liner 16. For convenience, the tape 10 and each layer thereof will be referred to as including a front side and an oppositely-disposed backside configured to be directed away from and toward, respectively, a surface of a panel to which the tape 10 is to be applied during use thereof. Furthermore, the tape 10 and each layer thereof will further be described as including a length along a longitudinal direction aligned with a longitudinal axis of the tape 10, and a width in a lateral direction perpendicular to the longitudinal axis. The tape 10 may be manufactured so that the first and second tape sections 12 and 14 overlap each other, as seen in FIGS. 1 through 3. In the nonlimiting embodiment shown in FIGS. 1 through 3, the first and second tape sections 12 and 14 are parallel to each other in the longitudinal direction of the tape 10, and the first tape section 12 overlaps a longitudinal portion of the front side of the second tape section 14. As also represented in FIGS. 1 through 3, the release liner 16 removably covers and preferably entirely conceals the backside 18 (FIG. 3) of the first tape section 12 of the tape 10.

In the embodiment shown in FIGS. 1 through 3, the first tape section 12 may be formed of or by a layer of a foil material and the second tape section 14 may be formed of or by a layer of a paper material, though other materials could be used as should become apparent from the following description. It is also within the scope of the invention that the tape 10 be constructed as a mesh tape 10. As a nonlimiting example, the second tape section 14 of the tape 10 may be a mesh drywall finishing tape 14, which may be assembled as previously described to a foil that forms the first tape section 12 of the tape 10. The tape 10 can be used to seal a gap between a drywall panel (or other wall, floor, or ceiling covering) and an object present within a hole or opening in the panel. The construction of a tape 10 constructed with paper-based or mesh-based materials as their second tape section 14 may be similar if not identical. The utilization of a tape 10 that incorporates a mesh-based material has notable benefits. Commercially-available mesh drywall finishing tapes are fabricated from polymeric-based materials, for example, fiberglass, which are moisture resistant and can be used in wet areas such as bathrooms, are often much more flexible in comparison to the paper-based tapes.

One or both of the first and second tape sections 12 and 14 may include a pressure-sensitive adhesive (not visually depicted in the drawings) on the backsides thereof. In the embodiment shown in the drawings, the first (foil) tape section 12 includes a pressure-sensitive adhesive on its backside 18, whereas the second (paper) tape section 14 does not. As such, the adhesive on the first tape section 12 can be employed to secure the entire tape 10, i.e., both the first and second tape sections 12 and 14, to a surface of a drywall panel. For this purpose, the release liner 16 is removed from the backside 18 of the first tape section 12 to expose the adhesive on its backside 18, after which the tape 10 may be applied to a surface and secured thereto with the exposed adhesive on the backside 18 of the first tape section 12.

Various manufacturing techniques can be employed to produce the tape of FIGS. 1 through 3. As a nonlimiting example, the first and second tape sections 12 and 14 can be provided by two discrete and separate feed tapes that are individually wound to form rolls that are mounted to separate spindles. The feed tape comprising the first tape section 12 may optionally include the release liner 16 pre-applied to the backside 18 of the first tape section 12 and secured thereto with the pressure-sensitive adhesive. The release liner 16 may be unwound from a separate feed tape so that the first tape section 12 and release liner 16 are separately fed to a spool where the first and second tape sections 12 and 14 and release liner 16 are recombined and assembled to produce the final tape 10. The longitudinal axes of the first tape section 12 and release liner 16 are aligned during assembly of the tape 10, but the longitudinal axis of the second tape section 14 is horizontally offset so that the release liner 16 is reapplied to the backside 18 of the first tape section 12. This arrangement results in overlapping of the first and second tape sections 12 and 14 and the adhesive on the backside 18 of the first tape section 12 bonding a longitudinal edge portion at the front side of the second tape section 14 to an adjacent longitudinal edge portion at the backside 18 of the first tape section 12. The front side of the release liner 16 is re-applied and secured with the adhesive to the remaining exposed portion on the backside 18 of the first tape section 12. Since the release liner 16 is wider than the exposed portion on the backside 18 of the first tape section 12 due to the overlapping of the first and second tape sections 12 and 14, the edge portion on the front side of the release liner 16 loosely overlaps the adjacent edge portion on the backside of the second tape section 14.

Alternatively, is it foreseeable that the first and second tape sections 12 and 14 may be in a side-by-side arrangement or spaced apart and secured to one another with an additional layer (not shown). Further, the release liner 16 may be equal in width to the remaining exposed portions of the backside 18 of the first tape section 12 with the adhesive thereon, or equal in width to the entire backside of the tape 10, for example, if both the first and second tape sections 12 and 14 include an adhesive on the backsides thereof.

Figure 4:
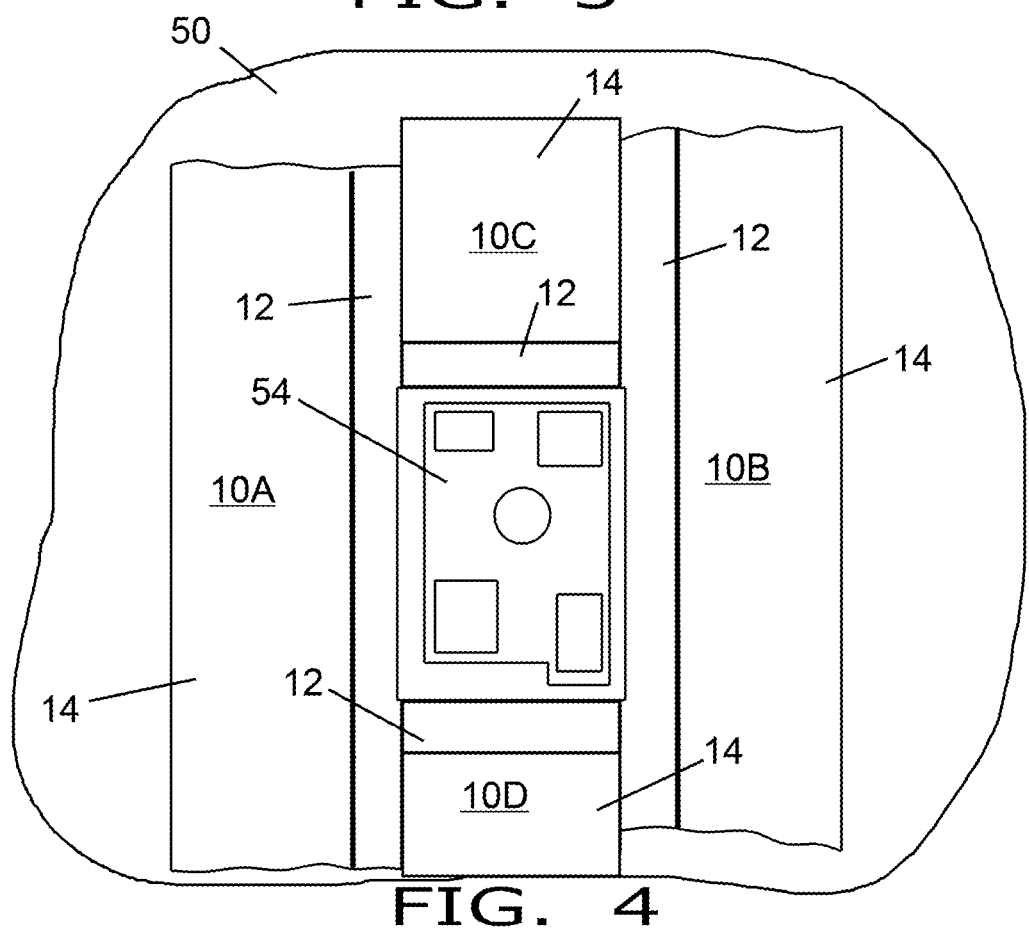
FIG. 4 schematically represents a nonlimiting example of the multilayered adhesive tape of FIGS. 1 through 3 applied to a drywall panel to cover and/or seal gaps between edges formed by an opening in the surface of the panel and an electrical outlet box installed in the opening.

FIG. 4 schematically represents a use of the tape 10 of FIGS. 1 through 3 to cover gaps between cut edges of a drywall panel 50 and the perimeter of a fixture (an electrical outlet box) 54 present within a hole or opening previously formed in the panel 50. Individual and separate segments 10A-10D of the tape 10 are secured so that their individual first tape sections 12 are adjacent and overlap the outlet box 54 and their second tape sections 14 overlap the drywall panel 50. For each tape segment 10A-10D, the edge portion of the first tape section 12 farthest from the second tape section 14 has been folded inward into the interior of the outlet box 54, so that the first tape section 12 bridges and seals a gap between the outer perimeter of the outlet box 54 and the edge of the opening, and in so doing the first tape sections 12 cover and adhere to the edges of the opening and extend into and adhere to the outlet box 54 installed in the opening. In the nonlimiting example depicted, the tape segments 10A and 10B were applied first, followed by the tape segments 10C and 10D such that the latter overlie edge portions of the first tape section 12 of each tape segments 10A and 10B that were not folded into the interior of the outlet box 54. The second tape sections 14 of the tape segments 10A-10D may later be covered with a drywall patching compound (e.g., putty, spackle, joint compound, etc.) and sanded to blend the area surrounding the outlet box 54 with the drywall panel 50 and provide a finished surface.

Figure 5:
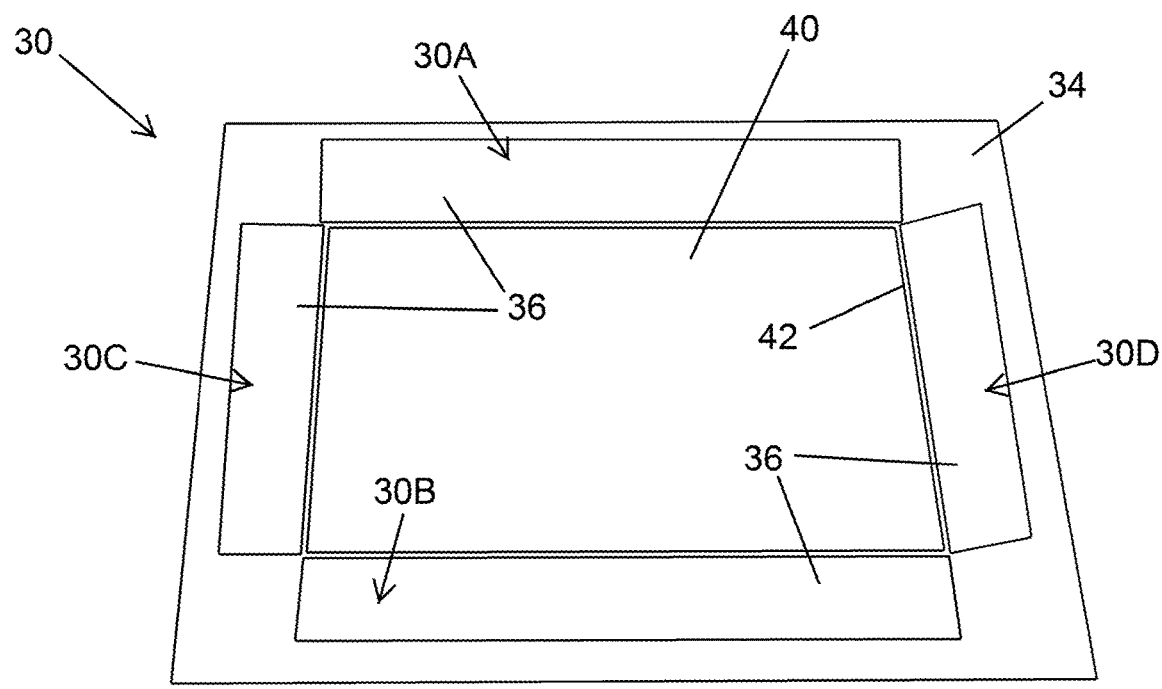
FIGS. 5 and 6 schematically represent opposite surfaces of a nonlimiting embodiment of a multilayered adhesive sheet in accordance with certain aspects of the present invention.
Figure 6:
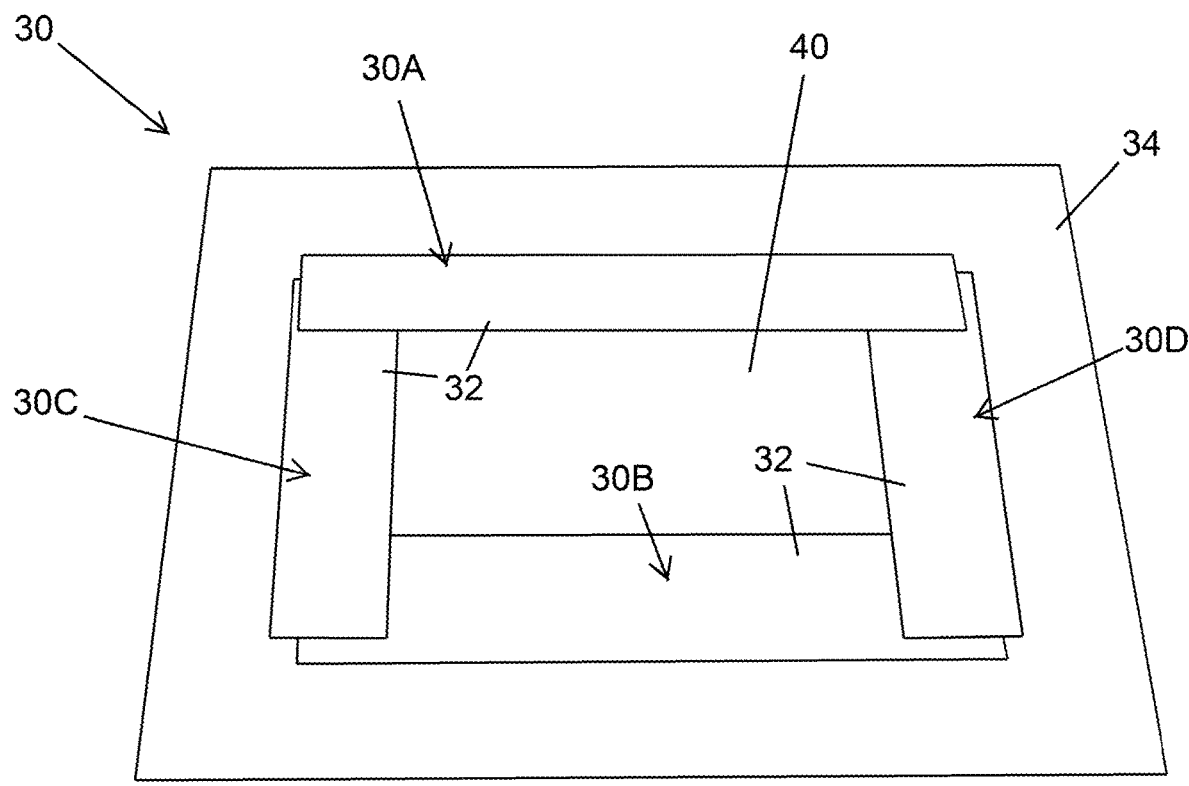

FIGS. 5 and 6 represent front views of the aforementioned multilayered adhesive sheet 30, which can be prefabricated for use in place of the tape 10 represented in FIGS. 1 through 4, for example, sized for use with an electrical outlet box as well as a wide variety of other fixtures. As such, the sheet 30 preferably has the same or a similar construction to the tape 10 of FIGS. 1 through 4. As such, the sheet 30 comprises first and second sheet sections 32 and 34 and a release liner 36, generally corresponding to the first and second tape sections 12 and 14 and release liner 16 as arranged in FIGS. 1 through 3. However, the sheet 30 permits a single product to be purchased and applied as a single unit, instead of requiring the application of multiple tape segments as shown in FIG. 4.

The sheet 30 shown in FIGS. 5 and 6 includes a preformed aperture 40 therethrough whose shape and size are configured to surround a correspondingly-sized opening in a panel into which a fixture will be installed, as nonlimiting examples, an opening for an electrical outlet box, an HVAC air duct, etc. It should be understood that the sheet 30 and its aperture 40 may be produced in shapes other than rectangular so as to be customized for use with a wide variety of fixtures. The aperture 40 and its perimeter are effectively defined by the second sheet section 34, which is continuous and completely surrounds the aperture 40. The sheet 30 comprises four sheet segments 30A-30D generally configured as flaps that are each cantilevered into the aperture 40 from the interior perimeter 42 of the second sheet section 34. Each sheet segment 30A-30D comprises a first sheet section 32 (visible in FIG. 6) and a release liner 36 (FIG. 5). As with the tape 10 of FIGS. 1 through 4, removal of the release liner 36 exposes an adhesive on the first sheet section 32, which enables the first sheet sections 32 to cover and adhere to the edges of an opening cut in a drywall panel and extend into and adhere to a fixture installed in the opening.

Figure 7:
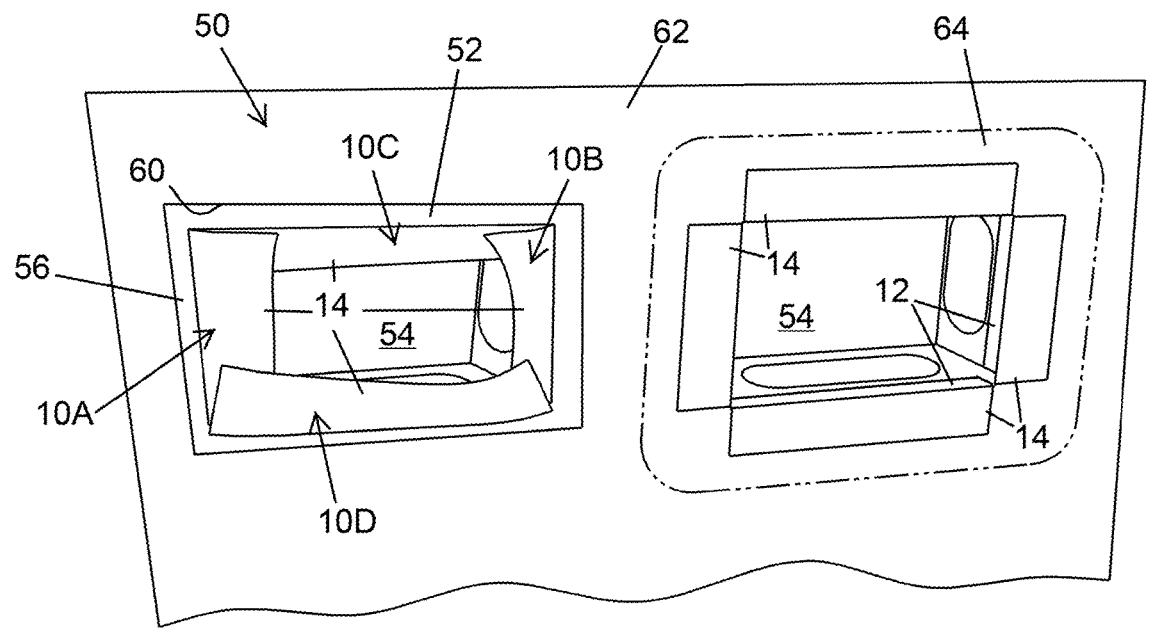
FIGS. 7 and 8 schematically represent nonlimiting examples of the multilayered adhesive tape of FIGS. 1 through 3 applied to a drywall panel to cover and/or seal gaps between edges formed by openings in the surface of the panel and air ducts installed in the openings.
Figure 8:
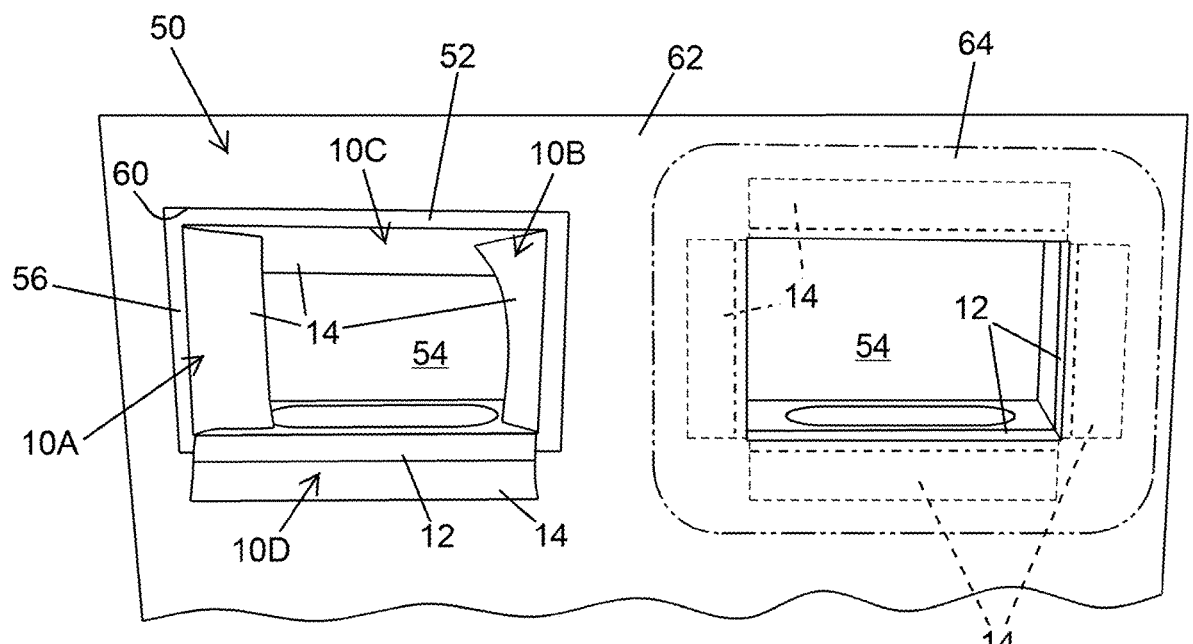

FIGS. 7 and 8 schematically represent a drywall panel 50 with two rectangular-shaped holes or openings (cutout sections) 52 each exposing an opening (inlet or outlet) of an air duct 54, similar to what was described in FIG. 9. The openings 52 are used to illustrate a procedure for using the tape 10 of FIGS. 1 through 3 to seal a gap 56 created between the outer perimeter of each air duct 54 and the edges 60 of each opening 52 in the panel 50. Segments 10A-10D of the tape 10 of FIGS. 1 through 3 have been applied to the lefthand opening 52 in FIG. 7, each adhered to the interior of the duct 54 with its first tape section 12 (not visible in FIG. 7), but with their second tape sections 14 tucked into the air duct 54 to expose the gap 56 created between the cut edges 60 of the panel 50 and the air duct 54. In FIG. 8, one of the tape segments 10D applied to the lefthand opening 52 has been manipulated to remove its second tape section 14 from the air duct 54. Segments 10A-10D of the tape 10 of FIGS. 1 through 3 have been similarly applied to the righthand opening 52 in FIGS. 7 and 8, but the tape segments 10A-10D have been further manipulated so that the gap 56 between the drywall panel 50 and air duct 54 has been completely covered and sealed with the first tape sections 12 of the tape segments 10A-10D. The righthand opening 52 in FIG. 7 further depicts a drywall patching compound 64 applied to the surface 62 of the panel 50 surrounding the tape segments 10A-10D as well as to the second tape sections 14 of the tape segments 10A-10D to adhere their second tape sections 14 to the surface 62 of the drywall panel 50. In FIG. 8, the righthand opening 52 has undergone further finishing to prepare the drywall panel 50 and the drywall patching compound 64 for painting, wallpapering, etc.

Figure 10:
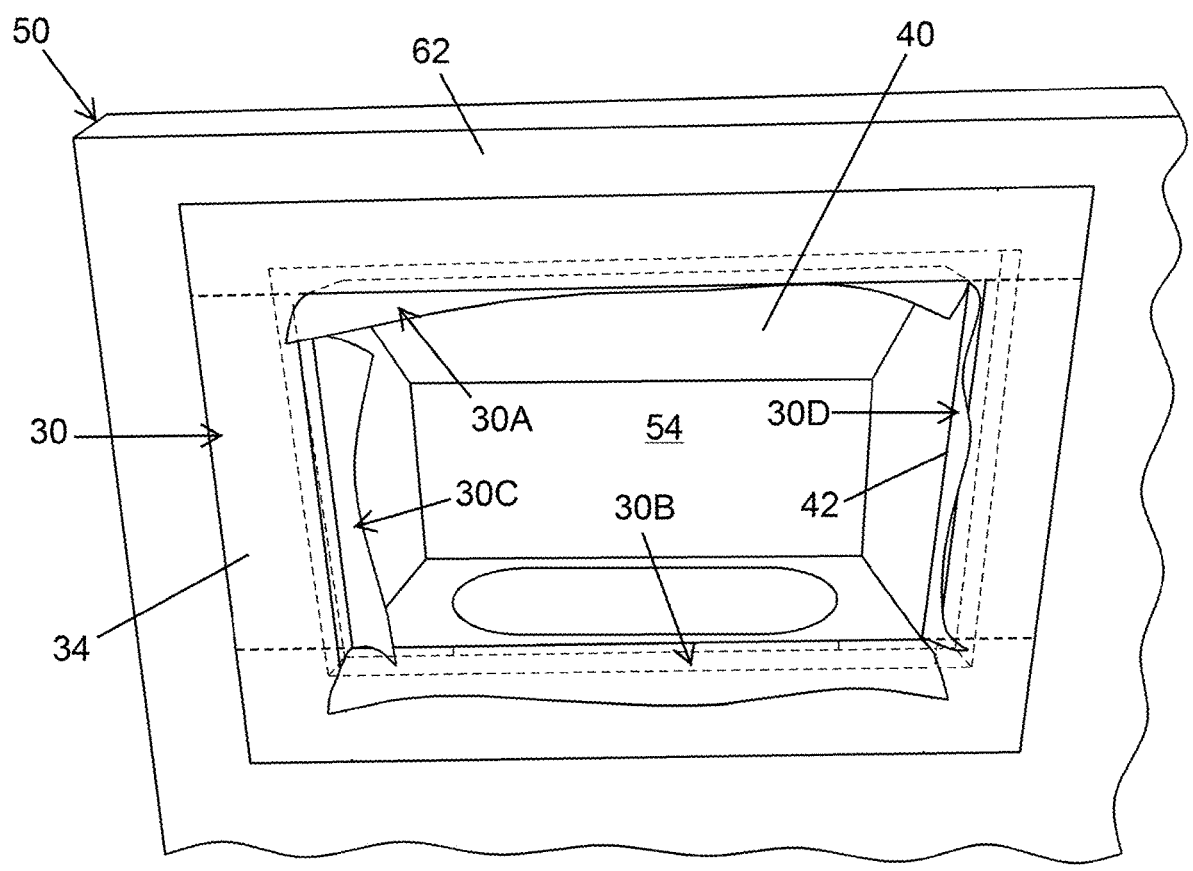
Figure 11:
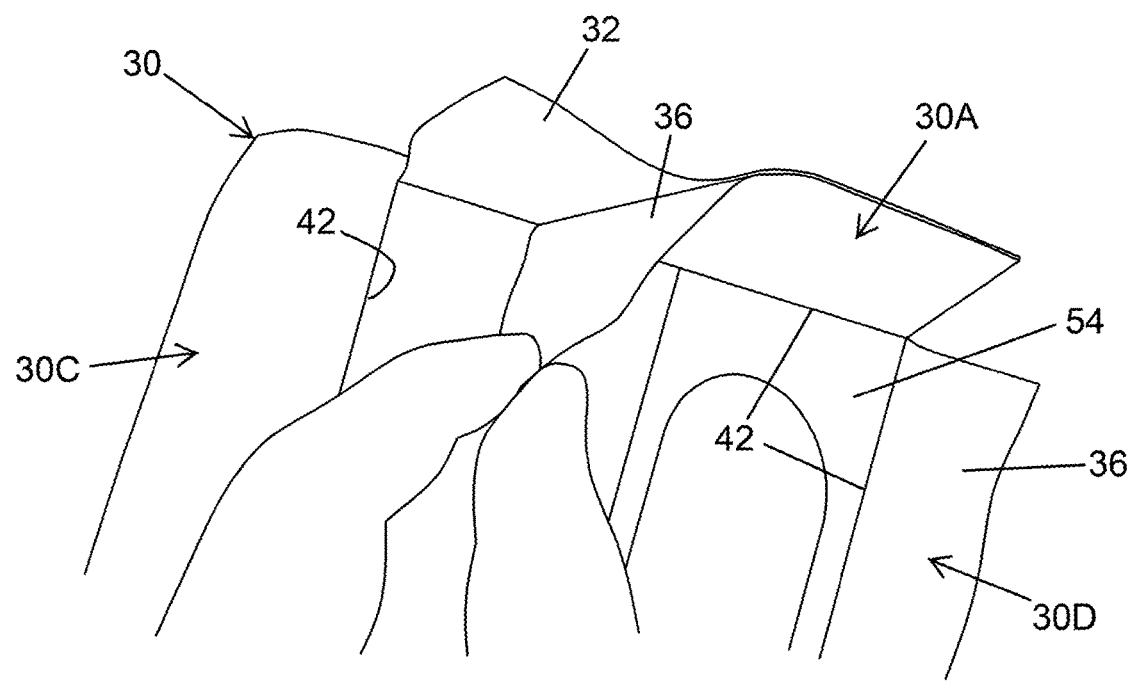
Figure 12:
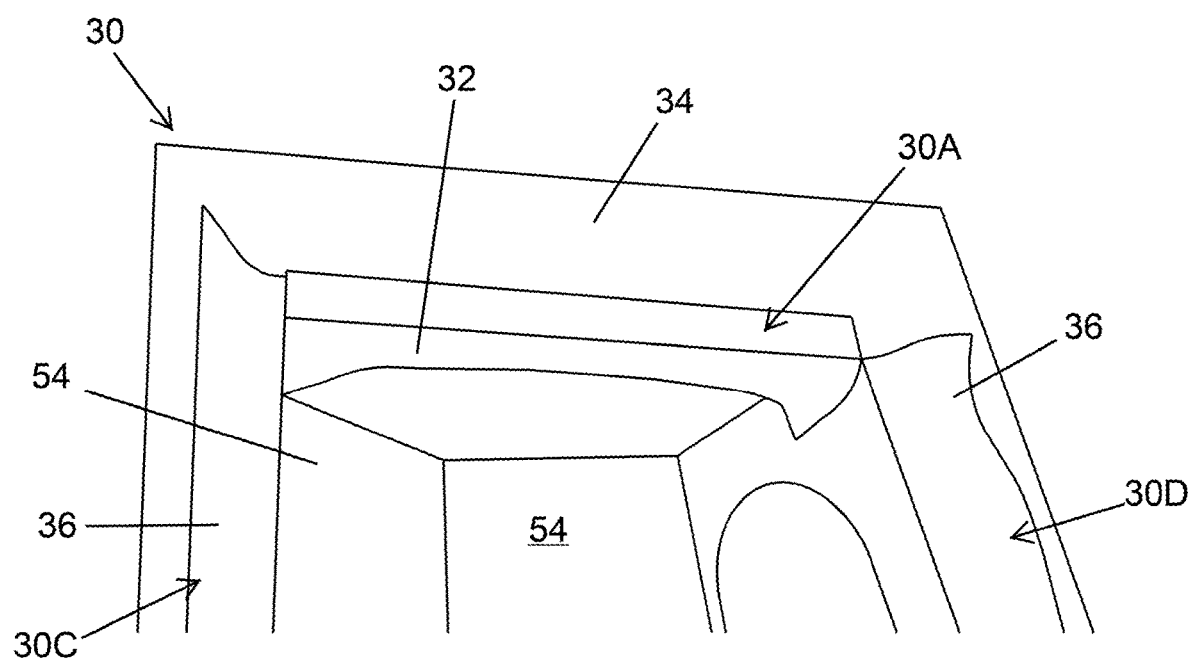
Figure 13:
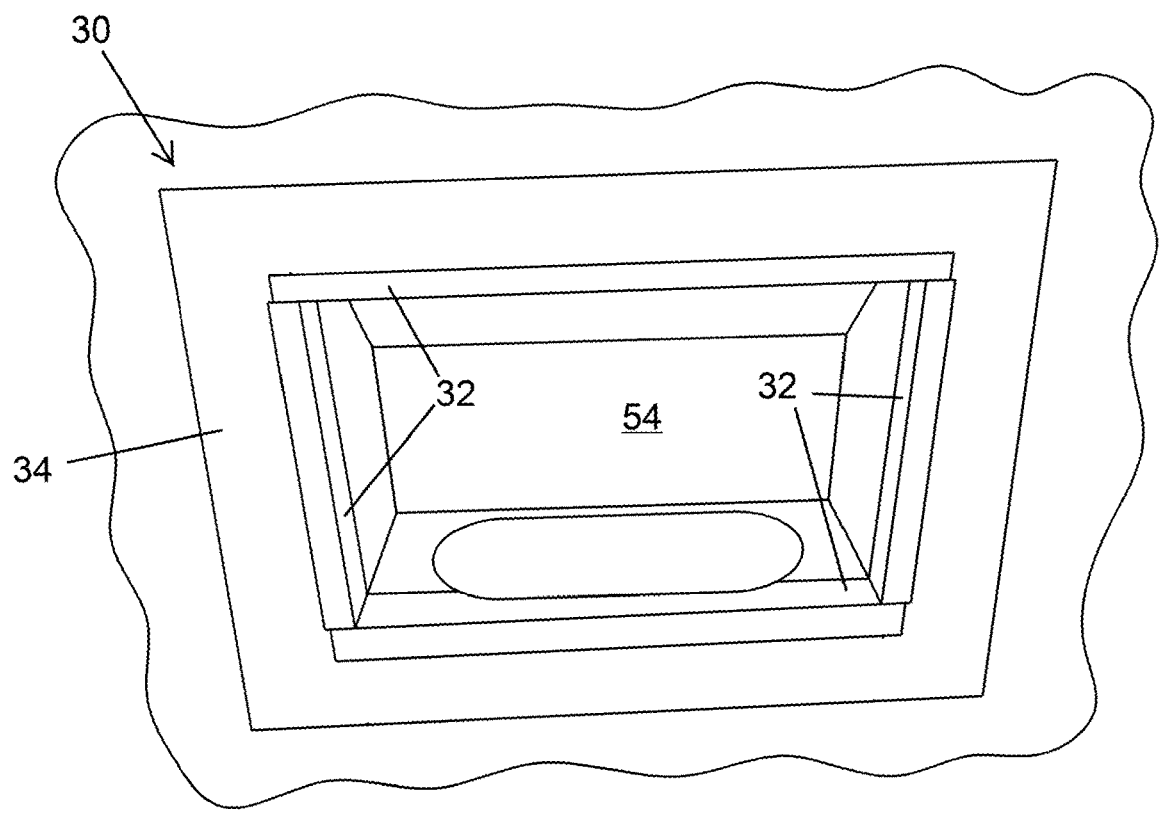
Figure 14:
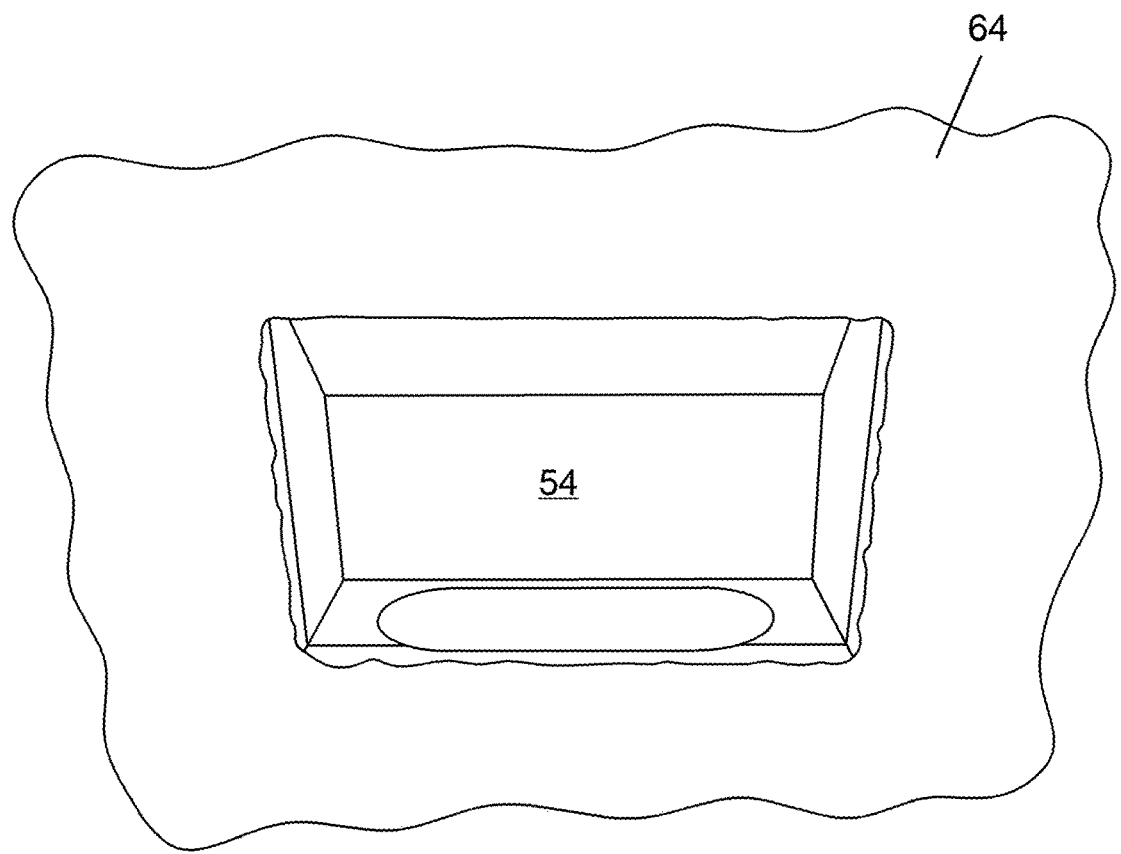

As previously discussed, FIG. 9 depicts a drywall panel 50 with a rectangular-shaped hole or opening (cutout sections) 52 that exposes an air duct 54. FIGS. 10 through 14 represent steps employed when using the sheet 30 of FIGS. 5 and 6 to cover the gap 56 between the cut edges 60 of the drywall panel 50 and air duct 54 of FIG. 9. Initially, the sheet 30 is located over the air duct 54 to generally align the air duct 54 with the aperture 40 defined by the second sheet section 34 of the sheet 30, which generally forms a frame of the sheet 30. The sheet 30 may be temporarily secured by placing its first sheet sections 32 in the air duct 54 (FIG. 10). Once positioned, the release liners 36 may be removed from the first sheet sections 32 to expose the adhesive thereon (FIG. 11). Each individual first sheet section 32 may then be bent inward and secured to an adjacent interior surface of the air duct 54 (FIG. 12) to seal the gaps and produce clean edges around the opening 52 in the panel 50 (FIG. 13). Subsequently, the sheet 30 may be covered with a drywall patching compound 64 and sanded to blend the area surrounding the air duct 54 with the drywall panel 50 and provide a finished surface (FIG. 14).

As previously noted, the first and second tape sections 12 and 14 of the tape 10 and the first and second sheet sections 32 and 34 of the sheet 30 described above may be formed of various materials. Preferably, the second tape section 14 of the tape 10 and the second sheet section 34 of the sheet 30 are formed of materials capable of being covered with a drywall patching compound (e.g., putty, spackle, joint compound, etc.) and subsequently one or more additional layers, such as paint, wallpaper, etc. Nonlimiting materials for these sections 14 and 34 include paper-based products and polymeric mesh-based products such as those commonly used for drywall tape. Preferably, the first tape section 12 of the tape 10 and the first sheet section 12 of the sheet 30 are formed of a semi-rigid and malleable material which may be manually bent or molded over edges of construction materials and/or fixtures, resulting in the sections 12 and 32 being plastically deformable to retain their bent/molded shape and thereby plastically conform to the edges of the construction materials and/or fixtures. Nonlimiting materials for the sections 12 and 32 include relatively thin metallic materials such as metal foils.

While the invention has been described in terms of specific or particular embodiments, it should be apparent that alternatives could be adopted by one skilled in the art. For example, the tape 10 and/or sheet 30 could differ in appearance and construction from the embodiments described herein and shown in the drawings, functions of certain components of the tape 10 and/or sheet 30 could be performed by components of different construction but capable of a similar (though not necessarily equivalent) function, and various materials could be used in the fabrication of the tape 10 and sheet 30. Accordingly, it should be understood that the invention is not necessarily limited to any embodiment described herein or illustrated in the drawings. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:

1. A device in the form of a tape having an elongated length in a longitudinal direction parallel to a longitudinal axis of the tape and a width in a lateral direction perpendicular to the longitudinal axis, the device comprising:
   at least first and second sections extending along the length of the device, each of the first and second sections having a front side and an oppositely-disposed backside, each of the first and second sections having oppositely-disposed first and second longitudinal edges in the lateral direction, the first and second sections partially overlapping in the lateral direction only along the first longitudinal edges thereof so that the first section has an nonoverlapping longitudinal edge portion on the backside thereof that adjoins the second longitudinal edge thereof, the second section has an nonoverlapped longitudinal edge portion on the front side thereof that adjoins the second longitudinal edge thereof, and the second longitudinal edges of the first and second sections define oppositely-disposed outermost longitudinal edges of the tape, the overlapping longitudinal edge portion on the backside of the first section facing and being adhered to the overlapped longitudinal edge portion on the front side of the second section, the backsides of the first and section sections together entirely defining a backside of the tape, the first section being formed of a first material configured to be bent and molded to plastically conform to an edge of a surface, the second section being formed of a second material that is different from the first material;
   an adhesive located on the nonoverlappind longitudinal edge portion at the backside of the first section to secure the device to the edge of the surface; and
   a release liner releasably secured by the adhesive, concealing the adhesive on the nonoverlappind longitudinal edge portion on the backside of the first section, and adjoining the second longitudinal edge of the first section.

2. The device of claim 1, wherein the second material is a paper-based material.

3. The device of claim 1, wherein the second material is a polymeric mesh-based material.

4. The device of claim 1, wherein the first material is a metal foil.

5. The device of claim 1, wherein the release liner is equal in width to the backside of the tape.

6. The device of claim 1, wherein the adhesive adheres the overlapping longitudinal edge portion on the backside of the first section to the overlapped longitudinal edge portion on the front side of the second section.

* * * * *